(12) United States Patent
Menon et al.

(10) Patent No.: US 11,790,458 B1
(45) Date of Patent: Oct. 17, 2023

(54) SYSTEMS AND METHODS FOR MODELING TELEMATICS, POSITIONING, AND ENVIRONMENTAL DATA

(71) Applicant: State Farm Mutual Automobile Insurance Company, Bloomington, IL (US)

(72) Inventors: Sunish Menon, Normal, IL (US); Weixin Wu, Normal, IL (US); Bernardo Bracero, Bloomington, IL (US); Jeffrey Wilson Stoiber, Bloomington, IL (US); Stan E. Gozur, Bloomington, IL (US); Jeremy Shawn Fogg, Bloomington, IL (US); Phillip Sangpil Moon, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 52 days.

(21) Appl. No.: 17/237,884

(22) Filed: Apr. 22, 2021

Related U.S. Application Data

(60) Provisional application No. 63/083,627, filed on Sep. 25, 2020, provisional application No. 63/014,404, filed on Apr. 23, 2020.

(51) Int. Cl.
*G06Q 40/08* (2012.01)
*G06N 20/00* (2019.01)
(Continued)

(52) U.S. Cl.
CPC ............. *G06Q 40/08* (2013.01); *G06N 20/00* (2019.01); *G07C 5/008* (2013.01); *G07C 5/0841* (2013.01)

(58) Field of Classification Search
CPC ........ G06Q 40/08; G06N 20/00; G07C 5/008; G07C 5/0841
(Continued)

(56) References Cited

U.S. PATENT DOCUMENTS

| | | |
|---|---|---|
| 8,090,598 B2 | 1/2012 | Bauer et al. |
| 8,595,034 B2 | 11/2013 | Bauer et al. |

(Continued)

FOREIGN PATENT DOCUMENTS

| | | |
|---|---|---|
| KR | 2012040496 A | 4/2012 |
| SK | 5988 Y1 | 8/2011 |

OTHER PUBLICATIONS

Lu DN, Nguyen DN, Nguyen TH, Nguyen HN. Vehicle Mode and Driving Activity Detection Based on Analyzing Sensor Data of Smartphones. Sensors (Basel). Mar. 29, 2018;18(4):1036. doi: 10.3390/s18041036. PMID: 29596397; PMCID: PMC5948751 (Year: 2018).*

*Primary Examiner* — Elda G Milef
(74) *Attorney, Agent, or Firm* — Armstrong Teasdale LLP

(57) ABSTRACT

Provided herein is a modeling computing device including a processor in communication with a memory device. The processor is configured to: (i) retrieve, from the at least one memory device, historical data associated with a plurality of users, wherein the historical data includes historical liability amount data and historical user data, and wherein the historical user data includes at least one of historical personal information, historical vehicle telematics data, and historical environmental data, (ii) generate a model that relates the historical liability amount data and the historical user data, (iii) store the model in the at least one memory device, (iv) collect current user data associated with a candidate user, wherein the current user data includes current personal information, current vehicle telematics data,
(Continued)

and current environmental data, and (v) analyze the collected current user data using the generated model.

17 Claims, 6 Drawing Sheets

(51) Int. Cl.
    *G07C 5/08*     (2006.01)
    *G07C 5/00*     (2006.01)

(58) Field of Classification Search
    USPC .......................................................... 705/4
    See application file for complete search history.

(56) References Cited

U.S. PATENT DOCUMENTS

| | | |
|---|---|---|
| 9,311,271 B2 | 4/2016 | Wright |
| 9,633,487 B2 | 4/2017 | Wright |
| 9,898,759 B2 | 2/2018 | Khoury |
| 10,192,369 B2 | 1/2019 | Wright |
| 10,198,879 B2 | 2/2019 | Wright |
| 10,380,695 B2 | 8/2019 | Berg et al. |
| 10,410,288 B2 | 9/2019 | Bowne et al. |
| 10,650,470 B1 | 5/2020 | Manzella et al. |
| 10,713,726 B1 | 7/2020 | Allen et al. |
| 10,878,510 B2 | 12/2020 | Perl et al. |
| 10,949,925 B2 | 3/2021 | Bowne et al. |
| 11,308,737 B1 * | 4/2022 | Smith .................. H04W 4/023 |
| 2006/0212195 A1 | 9/2006 | Veith et al. |
| 2011/0040579 A1 | 2/2011 | Havens |
| 2011/0161119 A1 | 6/2011 | Collins |
| 2014/0379384 A1 | 12/2014 | Duncan et al. |
| 2018/0336640 A1 | 11/2018 | Dziabiak et al. |
| 2019/0147538 A1 | 5/2019 | Duan et al. |
| 2020/0134735 A1 | 4/2020 | Carver et al. |
| 2020/0211303 A1 * | 7/2020 | Walsh .................... G06N 20/00 |
| 2020/0279335 A1 | 9/2020 | Wasserman |
| 2021/0042844 A1 | 2/2021 | Potter et al. |
| 2021/0049840 A1 | 2/2021 | Moghtadai et al. |
| 2022/0126878 A1 * | 4/2022 | Moustafa .............. H04L 9/3213 |

* cited by examiner

US 11,790,458 B1

SYSTEMS AND METHODS FOR MODELING TELEMATICS, POSITIONING, AND ENVIRONMENTAL DATA

CROSS-REFERENCE TO RELATED APPLICATIONS

This application claims the benefit of priority of U.S. Provisional Patent Application Ser. No. 63/014,404, filed Apr. 23, 2020, entitled "SYSTEMS AND METHODS FOR MODELING TELEMATICS, POSITIONING, AND ENVIRONMENTAL DATA" and U.S. Provisional Patent Application Ser. No. 63/083,627, filed Sep. 25, 2020, entitled "SYSTEMS AND METHODS FOR MODELING TELEMATICS, POSITIONING, AND ENVIRONMENTAL DATA", the entire contents and disclosures of each are hereby incorporated herein by reference in their entirety.

FIELD OF THE DISCLOSURE

The present disclosure relates to systems and methods for building models to analyze collected data, and more particularly, to systems and methods for building models based upon historical data to analyze collected telematics, positioning, and/or environmental data.

BACKGROUND

Vehicle insurance provides financial protection against physical damage and/or bodily injury caused by a vehicular accident. Other financial protections may be provided, such as vehicle theft protection or weather-related damage protection. Conventionally, vehicle insurance rates or premiums may be typically determined based upon a driver's age and driving history, a vehicle make, model, and year, among a myriad of other factors.

Some insurance policies (e.g., vehicle insurance, rental insurance, homeowners insurance, and/or property insurance) provide coverage for loss or damage to personal possessions of a policyholder during a policy claim (e.g., a formal request by the policyholder to an insurance provider for reimbursement for one or more personal possessions covered under an insurance policy). Loss events may include vehicle damage, residential fires, theft, vandalism and/or other events that cause partial or complete loss of the personal possessions of the policyholder.

Policy coverage may typically be associated with the amount of risk or liability that is covered by the insurance provider for the policyholder's possessions during these loss events. Insurance providers may typically set policy premiums based upon a number of factors including an amount of coverage that the policy provides (e.g., policy coverage or insurance coverage). An insurance policy may have different limits, such as coverage limits (e.g., limits of liability) and aggregate limits. Different types of insurance policies limits may typically include payout limits to a policy holder with respect to payouts over time, the maximum amount the insurer will pay, or a combination thereof.

Insurance premiums and coverage rates may depend on, at least in part, coverage limits or limits of liability, also referred to as liability limits. At least some applications may benefit from accurately predicting the likelihood of insurance claims being made by policyholders. In such applications, insurance claim costs may be anticipated. Further, based upon the likelihood of insurance claims being made and their respective costs, insurance policy premium prices may be determined appropriately.

However, current solutions may lack the ability to provide accurate predictions of liability limits for users. Current solutions may also be inefficient, cumbersome, untimely, burdensome, and/or have other drawbacks.

BRIEF SUMMARY

The present embodiments may relate to, inter alia, systems and methods for building a model to analyze collected data. The model may be built using historical data (e.g., historical user data and/or historical liability limit data) to analyze collected data including telematics, positioning, and/or environmental data. In some embodiments, the model may use the historical data to relate historical liability limit data to historical user data (e.g., personal data including filed claim data and natural loss data and telematics, positioning, and/or environmental data). Accordingly, the collected data may be input into the model to determine a liability limit for a user associated with the collected data. In some embodiments, the liability limit may be used to generate an insurance policy for the user, and the liability limit may be associated with a maximum amount for which an insurance company associated with the insurance policy is accountable.

In an exemplary embodiment, the model may be created through the gathering of established user data records and historical data associated with a plurality of users. The user data records may include user driving history and insurance data (e.g., claims data, premium cost data, etc.). User data and historical data may also include positional data and/or telematics data reported from one or more measurement sensory devices, such as a GPS device, an accelerometer, a gyroscope, or other sensors mounted within user computing devices (e.g., mobile devices or tablets) or integrated into vehicles operated by the users. Historical user data may also include environmental data associated with the users or a surrounding area of the users (e.g., traffic data, pedestrian data, etc.). The model may be built by relating one or more sets of the historical data. In some embodiments, the model may be built by relating one or more of the historical vehicle positional, telematics data, and/or environmental data with the historical insurance data. For example, the model may be used to determine and/or predict an insurance liability amount based upon historical position, telematics, and/or environmental data.

In another exemplary embodiment, systems and methods may provide feedback to users with respect to driving conditions, intersections, or the like. For example, a user may be provided with feedback with respect to their traveling speed when operating a vehicle in view of a posted speed limit. In another example, a user may be provided with data pertaining to a planned driving route. Data with respect to a certain route may indicate the number of traffic incidents that have occurred along the route over a certain time period (e.g., the past six months). Additionally or alternatively, users may be notified of dangerous areas (e.g., intersections) along a certain route. An optimal route may be suggested that is considered to be the lowest risk, or safest route. The optimal route may be determined using a combination of location data, historical telematics data, among other factors, such as weather data.

In one aspect, a modeling computing device including at least one processor in communication with a memory device may be provided. The at least one processor may be configured to: (i) retrieve, from the at least one memory device, historical data associated with a plurality of users, wherein the historical data includes historical liability limit data and historical user data, and wherein the historical user data includes at least one of historical personal information, historical vehicle telematics data, and historical environmental data, (ii) generate a model that relates the historical liability limits data and the historical user data, (iii) store the model in the at least one memory device, (iv) collect current user data associated with a candidate user, wherein the current user data includes current personal information, current vehicle telematics data, and current environmental data, and/or (v) analyze the collected current user data using the generated model. The modeling computing device may include additional, less, or alternate actions, including those discussed elsewhere herein.

In another aspect, a computer-implemented method implemented by a modeling computing device including at least one processor in communication with at least one memory device may be provided. The computer-implemented method may include (i) retrieving, from the at least one memory device, historical data associated with a plurality of users, wherein the historical data includes historical liability limit data and historical user data, and wherein the historical user data includes at least one of historical personal information, historical vehicle telematics data, and historical environmental data, (ii) generating a model that relates the historical liability limits data and the historical user data, (iii) storing the model in the at least one memory device, (iv) collecting current user data associated with a candidate user, wherein the current user data includes current personal information, current vehicle telematics data, and current environmental data, and/or (v) analyzing the collected current user data using the generated model. The computer-implemented method may include additional, less, or alternate actions, including those discussed elsewhere herein.

In yet another aspect, a computer-readable storage medium having computer-executable instructions embodied thereon may be provided. The computer-executable instructions, when executed by at least one processor, may cause the at least one processor to: (i) retrieve, from the at least one memory device, historical data associated with a plurality of users, wherein the historical data includes historical liability limit data and historical user data, and wherein the historical user data includes at least one of historical personal information, historical vehicle telematics data, and historical environmental data, (ii) generate a model that relates the historical liability limits data and the historical user data, (iii) store the model in the at least one memory device, (iv) collect current user data associated with a candidate user, wherein the current user data includes current personal information, current vehicle telematics data, and current environmental data, and/or (v) analyze the collected current user data using the generated model. The computer-readable storage medium may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
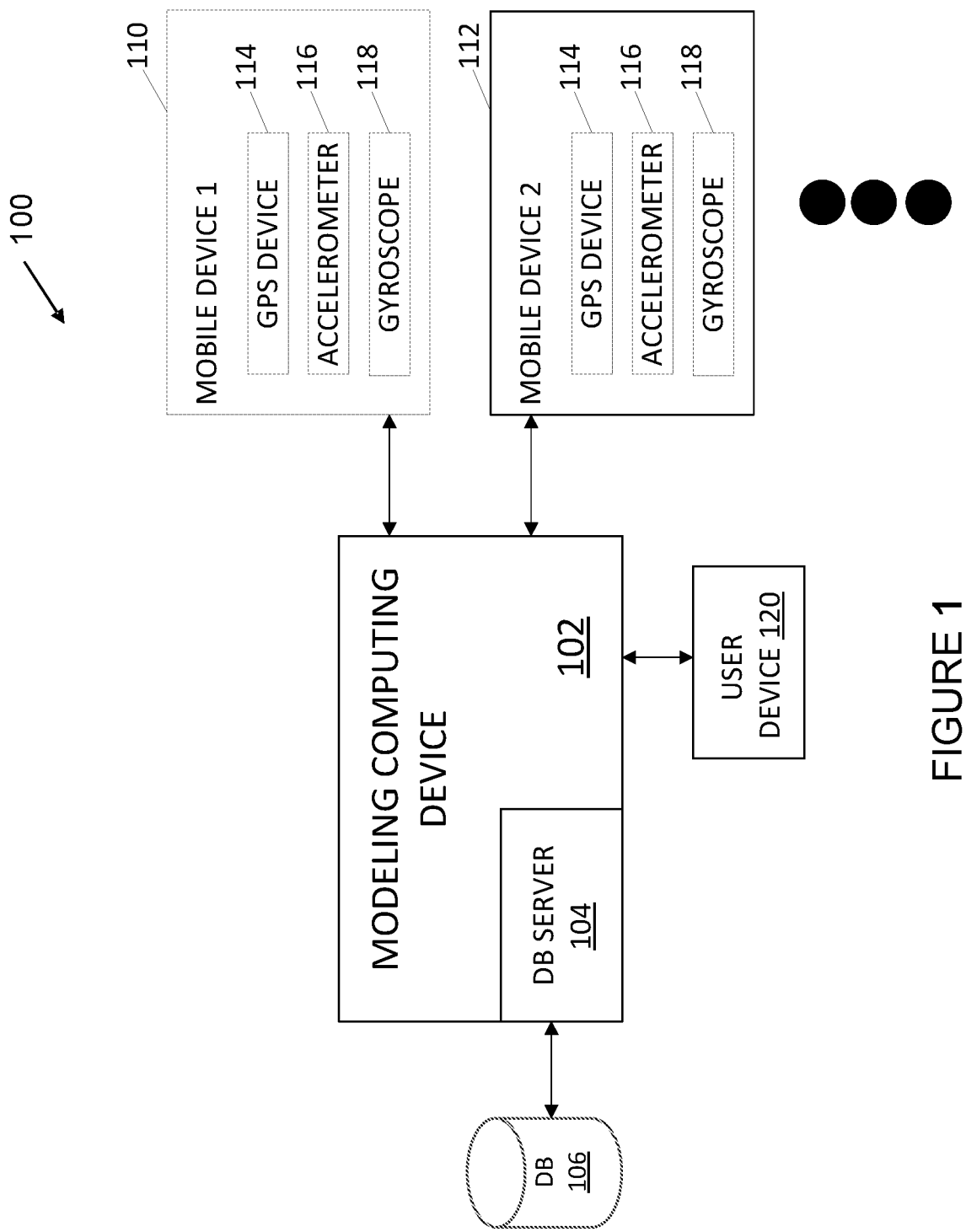
FIG. 1 illustrates an exemplary modeling system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for building a model to analyze collected data. The model may be built using historical data (e.g., historical user data and/or historical insurance data including historical liability limit data) to analyze collected data including telematics, positioning, and/or environmental data. In some embodiments, the model may use the historical data to relate historical liability limit data to historical user data (e.g., personal data including filed claim data and natural loss data and telematics, positioning, and/or environmental data). That is, the model may be built using the historical data to build relationships between the historical liability limit data and the historical user data. Accordingly, the collected data may be input into the model to determine a liability limit for a user associated with the collected data. In some embodiments, the liability limit may be used to generate an insurance policy for the user, and the liability limit may be associated with a maximum amount for which an insurance company associated with the insurance policy is accountable. In at least some embodiments, the methods may be implemented by a modeling computing device of a modeling computing system. Further, in some embodiments, the model may use the historical data to predict liability loss and/or a claim amount for a user. That is, the model may use the historical data to relate the historical user data (e.g., historical user data associated with driving habits of users) to both the likelihood that an accident will happen and an amount of liability loss (e.g., an amount the accident may likely cost for all people and property involved in the accident) or a claim amount (e.g., an amount of the cost of the damage to the user, the vehicle, and/or other property of the user) if an accident happens.

In an exemplary embodiment, the model computing device may create the model through the gathering of historical data associated with a plurality of users. The historical data records may include user driving history, home usage data, and insurance data (e.g., claims data, premium cost data, etc.). Historical data may also include positional data and/or telematics data, such as vehicle or home telematics data, reported from one or more measurement sensory devices, such as a GPS device, an accelerometer, a gyroscope, smart home sensors related to home usage (e.g., locking of doors, home capacity, thermostats, alarm systems, etc.) or other sensors mounted within user computing devices (e.g., mobile devices or tablets) or integrated into vehicles operated by the users or property of the users. Historical data may also include environmental data associated with the users or a surrounding area of the users (e.g., traffic data, pedestrian data, weather, etc.).

The model may be built by relating one or more sets of the historical data. In some embodiments, the model may be built by relating one or more of the historical vehicle positional, telematics data, and/or environmental data with the historical insurance data. For example, the model may be used to determine and/or predict an insurance liability limit, a liability loss amount, and/or a claim amount based upon historical position, telematics, and/or environmental data.

In the exemplary embodiment, the modeling computing device may collect current user data, also referred to herein as user data, associated with a candidate user (e.g., a user wishing to enroll in an insurance policy). The current user data may include personal data (e.g., user age, address, date of birth, occupation, etc.), telematics data (e.g. home or vehicle telematics data), positioning data, and/or environmental data. The telematics and positioning data may be collected from one or more sensory devices including a GPS device, an accelerometer, a gyroscope, or other sensors. The environmental data may be collected from sensors or other data sources (e.g., online or locally stored databases).

The current user data may be input to the model and analyzed based upon the model. For example, the model may determine a liability limit for the user based upon the input user data. In other embodiments, the model may predict any other data for the candidate user using the input current user data including, for example, insurance coverage limits, premium price points, a user driving score indicating how safely the user operates the vehicle, a user environment safety score include the safety of driving a vehicle in the environment surrounding the user, a user home safety score, etc. Further, for example, the model may predict a liability loss and/or a claim amount if a future accident occurs based upon the input user data.

As described below, systems and methods described herein generate a model using historical data (e.g., historical user data including telematics data, environmental data, and historical insurance claims data). The systems and methods may further include accurately predicting liability limits, a liability loss amount, and/or a claim amount for a user in view of the model by leveraging the user data associated with the user.

As used herein, "consumer," "user," or "policyholder" refers to any type of user of the system that provides data for building a training dataset for the model or, alternatively, provides data to the system to enable the system to accurately predict a liability limit for that user. As used herein, "telematics data" refers to any type of information or measurements that may be collected while a user is operating a vehicle, such as velocity, acceleration, direction, braking, cornering, location, speed, heading, driver behaviors (hard braking, jackrabbit starts, swerving, etc.), or the like. As used herein, "environmental data" refers to any type of information that may accurately describe a certain area surrounding a user during operation of a vehicle, such as types of intersection, number of cars on the road, number of nearby pedestrians, or the like.

As used herein, "liability limit" refers to an amount an insurance company may pay in the event of an accident, theft, or natural disaster, such as $100,000 per person and/or $400,000 total, per incident. These values are merely exemplary and are not meant to be limiting. As used herein, "liability loss amount" refers to an amount of the cost of bodily and property injury that may occur on others or on vehicles owned by others in an accident. Further, as used herein, "claim amount" refers to bodily and property injury that may occur to a user and a vehicle owned by the user in an accident. "Liability amounts," as used herein, may refer to liability limits, liability loss amounts, and/or claim amounts. As described herein, a liability limit, a liability loss amount, and a claim amount for a user may be predicted based upon multiple datasets, such as user telematics data and environmental data during operation of a vehicle by the user or home usage by the user.

Receiving Model Training Datasets

The modeling computing device may create a model based upon a plurality of training datasets including historical data (e.g., historical user data and historical insurance data). In some embodiments, a training dataset may include historical data associated with a plurality of respective users. The model may be created through the gathering of established user data records and other historical data (e.g., historical user data). The historical data may include different categories of information including, but not limited to, user driving history (e.g., years of experience driving, vehicle telematics data, etc.), insurance data (e.g., claims data, premium cost data, etc.), user home usage data or home telematics data (e.g., how well protected the home is, how the user manages the home, home presence data, home water usage data, home occupancy data, home electricity usage data, other home telematics data, etc.), and environmental data.

Historical data may include vehicle telematics data reported from one or more measurement sensory devices, such as a GPS device, an accelerometer, a gyroscope, or other sensors mounted within a user computing device (e.g., a mobile device or tablet) or integrated into or on a vehicle operated by the user or a property of the user. Other historical data considered may include the type of vehicle the user drives (e.g., model, size, cost, safety rating, etc.). Environmental data may include, but is not limited to, geographical surroundings such as landmarks, intersections, nearby pedestrians, posted speed limits, weather statuses and events, and other types of elements that may affect a user during operation of a vehicle or maintaining a property. The model may be built, for example, by relating the different sets of historical data. In one embodiment, the model relates historical liability limits with historical user data.

As described below, systems and methods described herein may generate liability limits and other coverage amounts (e.g., liability loss amounts and claim amounts), generally referred to herein as liability amounts. In some embodiments, the systems and methods described herein may include receiving measurements of geographic coordinates, telematics data (e.g., accelerometer and/or gyroscope measurements), and environmental data. The received data may pertain to a single user. In some embodiments, the received data may pertain to a group of users. Additionally or alternatively, data collected may be utilized to initialize a database as well as a model, such as the model for determining liability amounts described herein.

In some embodiments, the modeling computing device may aggregate data pertaining to either a single user or a group of users and be collected by one or more sensors associated with each user. Sensory data may be collected over a certain period of time (e.g., during vehicle operation by a user, while a property of the user is being rented, or another predetermined period of time).

User data may be collected by a mobile device associated with each user. Alternatively, user data may be collected by other devices that may be installed within a vehicle or property of the user. In some embodiments, user data may be collected by both the mobile device associated with the user and other devices installed within the vehicle or property of the user. Exemplary sensors may include, but are not limited to, a GPS device, an accelerometer, and a gyroscope.

The user data may include telematics data (such as "vehicle telematics data") regarding the driving characteristics, driving behaviors, and/or driving habits of the user (e.g., velocity, acceleration rates, location, time-of-day, turning events, braking events, defensive driving tendencies, aggressive driving behavior, average speed in relation to posted speed limits, quick acceleration, sharp cornering, and/or hard braking events). The user data may also include telematics data (such as "home telematics data") regarding how the user maintains a property of the user (e.g., locking doors at night or when occupants of the home are out, average temperature inside the home, how different appliances and areas of the house are maintained, water usage, electricity usage, presence information associated with people or animals (such as pets), occupancy information, home usage information, etc.). Sensory data may be collected with respect to the user and sent to a remote device, such as a central server, or the like, for further processing.

In some embodiments, environmental data may be gathered by the modeling computing device. Environmental data may be gathered in relation to a single user or a group of users. Environmental data may be collected by one or more sensors.

Additionally or alternatively, environmental data may be associated with a certain area. For example, a certain area may be defined within a perimeter of a user. A user perimeter may be determined based upon GPS coordinate data associated with the user. In some embodiments, a perimeter may be defined as a certain square mileage (e.g., 2 square miles) around a user. In another example, a perimeter may be defined as being within a block radius (e.g., a two block radius) of GPS coordinates of the user.

In some embodiments, environmental data may be gathered by a camera associated with a user. A camera may be installed on the vehicle of the user (e.g., a dashboard camera or "dash cam"), worn by the user (e.g., body cam), or may be remote to the user (e.g., a traffic camera). Environmental data may be collected by a single camera or multiple cameras. For example, multiple cameras may provide multiple views with respect to the environment of the user for collecting data. Camera data may be captured and transmitted to a central server for processing, for example. Captured camera data may include, but is not limited to, traffic data (e.g., congestion, traffic volume), weather data, non-vehicle data (e.g., pedestrians, bicyclists, etc.), vehicle data (e.g., vehicle models, vehicle types, vehicle class, etc.), and property data (e.g., square footage, occupancy, etc.). Image data captured by one or more cameras may be analyzed to identify the environmental data. Collected data may be transmitted to the modeling computing device via a network or by other communication methods, such as near-field communications, or the like.

Determining Liability Amounts Using the Model

In one exemplary embodiment, the modeling computing device may be configured to generate certain coverages and limits, such as various vehicle insurance liability amounts for a user based upon captured data pertaining to the user. In at least one embodiment, the modeling computing device may aggregate all of the captured data with respect to telematics data, location data, and environmental data pertaining to a user, and compare this aggregated data to one or more generated models of historical data. That is, the modeling computing device may build the model using historical user data, and input current user data into the model to determine liability amounts for the user based upon the current user data. The aggregated data may include additional or fewer data elements and the example set forth should not be considered limited but merely illustrative.

In some embodiments, the modeling computing device may utilize machine learning techniques for predicting liability amounts for different users based upon aggregated data pertaining to each user, such as telematics data, environmental data, and other factors, for example. In some embodiments, the modeling computing device may utilize machine learning and/or artificial intelligence techniques for building a model. The model may then be utilized by the modeling computing device for predicting liability amounts for users of the system.

Further, in some embodiments, the modeling computing device may be associated with (e.g., hosted by or in communication with) an insurance company. Accordingly, the modeling computing device may transmit the determined liability amounts for each user to the insurance company so that the insurance company may use the liability amounts for insurance policies of the user. For example, the insurance company may use the liability amounts to determine the insurance policy for the user (e.g., including the liability limits for which the user should be covered) and an insurance premium for the insurance policy (e.g., a price that the user pays monthly, bi-monthly, semi-annually, annually, etc. for the insurance policy coverage) that may be determined based upon the liability loss amount and/or the claim amount. In some embodiments, the modeling computing device may generate the insurance policies on behalf of the insurance companies and enroll the users in the insurance policies.

In some embodiments, systems and methods may be provided for predicting losses with respect to certain intersections, and the predicted losses (e.g., the liability loss amounts and the claim amounts) may be included in the model for determining liability amounts. For example, metrics may be derived for calculating certain likelihoods of events occurring with respect to certain traffic intersections. These likelihoods may be generated based upon historical data (e.g., determined from insurance claims data). Traffic data and other datasets, such as climate data, may be compared with road segments data to create risk profiles for intersections or locations. Risk profiles may include data sets predicting the severity of potential collisions along with other parameters (e.g., estimated loss, property damage, injury, etc.).

In some embodiments, a risk profile may be created for a certain area typically driven within by a user. For example, telematics data and positional data collected over time (e.g., two weeks, a month) may reveal a user's routine and most frequently-traveled routes. Based upon travel routes, a hypothetical claim may be created to estimate vehicle damage, other vehicle damage, pedestrian injury, property damage, bodily injury costs, among other claim elements. Accordingly, the risk profile and/or the hypothetical claims may be used by the modeling computing device to predict the liability loss amounts and claim amounts based upon input user data.

Systems and methods may be provided for identifying a risk level of various locations or routes. For example, a particular road segment or intersection may be identified as dangerous or risky based upon accident frequency, congestion levels, or the like.

In some embodiments, drivers that frequently travel through an area identified as high risk may have their liability amounts adjusted accordingly. For example, if drivers frequently travel through high risk areas, the modeling computing device may adjust the liability limits for the drivers by increasing the liability limits along with the predicted liability loss amounts and the claim amounts for the drivers (e.g., because the drivers may be more likely to get in costly accidents if the drivers drive through the high risk areas), which may result in higher insurance premiums for the insurance policies and corresponding liability limits. Further, the modeling computing device may adjust existing policies of users based upon this type of data. Additionally or alternatively, additional coverage or aggregate coverage may be added in view of data revealing a certain area having a higher number of people per vehicle, such as car pools or the like.

Even further, the modeling computing device may generate one or more recommendations to users based upon gathered data, such as telematics data and other environmental data gathered from users. The recommendations may come in the form of a notification, such as an email alert, a text message alert, or the like. For example, in the event that a user travels on a route through a high risk area on a regular basis, the modeling computing device may provide a notification including statistical data based upon the user's route with respect to traffic congestion levels, pedestrian data, accident frequency (e.g., in the past week, month, year, etc.), or the like. The recommendations provided may also include alternate forms of transportation (e.g., bus, trolley, subway, light rail, etc.). Additionally or alternatively, the recommendations may be tailored to newer or unfamiliar drivers by providing information to assist with making a decision for best route. The recommendations may be made in view of historical data gathered as described herein, for example. In some embodiments, the recommendations may include weather data, for example, severe weather data may alter a recommended route.

The modeling computing device may be configured to update the model on a continuous basis. For example, over time as data is collected with respect to a user during operation of a vehicle, this data may be used to update the model in view of liability amounts set forth with respect to the user. In some embodiments, the updated datasets may be utilized to adjust certain limits set for the user. Liability amount adjustments may be considered necessary in response to changes detected with respect to the aggregated datasets. For example, upon a determination that a user's environment has changed, such as a move from an urban area to a suburban area, the likelihood of future claims and the cost associated with those future claims made by the user may decrease.

In another non-limiting example, a liability amount predictor may determine a risk adjustment based upon one or more changes in a user's behavior while operating a vehicle. For example, a risk associated with a user may decrease in response to detecting safer driving habits based upon collected telematics data. On the other hand, a risk associated with a user may increase in response to detecting aggressive driving habits. Safe driving versus aggressive driving may be determined based upon a user's tendency to obey posted speed limits, making full and complete stops at stop signs as opposed to "rolling" stops, soft cornering versus sharp cornering, acceleration rates, such as jackrabbit starts, or the like.

Anti-Fraud Using Telematics Data

Systems and methods may be provided to use telematics data for accident re-creation for the purpose of fraud prevention. For example, telematics data may be aggregated from one or more sensors, such as from sensors of a user's device or sensors installed within the user's vehicle. Aside from telematics data, image data may be captured by one or more sensors, such as by a camera installed within a user's vehicle (e.g., a dashboard camera or "dash cam"). Aggregated data may be analyzed and used for accident recreation purposes. Based upon accident recreation, determination of fault of the actual accident may be realized. Additionally or alternatively, fraudulent insurance claims may be prevented or even identified. For example, movement and position data of a vehicle may be determined as well as other data points, such as phone usage by the driver, level of driver distraction while operating a vehicle, whether the driver's hands were on the steering wheel, or were they otherwise distracted (e.g., applying makeup, shaving, etc.).

Exemplary technical effects of the systems and methods described herein may include, for example: i) collecting unique historical data to generate a model, ii) collecting current user data associated with a candidate user, iii) using the model to analyze the current user data, iv) determining user-specific insurance coverage and/or corresponding insurance policies for the candidate user using the model based upon the input current user data, v) automatically generating insurance policies for the candidate user based upon the current user data and the corresponding analysis from the model, vi) providing a better model of insurance data based upon the multitudes of data (e.g., collected from a multitude of vehicles, user devices, insurance databases, etc.) used to build the model, vii) providing recommendations to users to lower insurance premiums based upon the current user data, and/or viii) adjusting insurance policies and corresponding premiums based upon received user data.

Exemplary Computing System for Predicting One or More Liability Amounts

FIG. 1 depicts an exemplary modeling computing system 100. Modeling computing system 100 may include a modeling computing device 102 (also referred to herein as a modeling server or a modeling computer device). Modeling computing device 102 may include a database server 104. Further, modeling computing device 102 may be in communication with, for example, a database 106, one or more user devices 110 and 112, and a client computing device, such as user device 120.

In the exemplary embodiments, user devices 110 and 112 may be computers that include a web browser or a software application, which enables the devices to access remote computer devices, such as modeling computing device 102, using the Internet or another type of network. More specifically, user devices 110 and 112 may be communicatively coupled to modeling computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 110 and 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Further, in the exemplary embodiment, user devices 110 and 112 may include a GPS 114, an accelerometer 116, and a gyroscope 118. GPS 114, accelerometer 116, and gyroscope 118 may be configured to gather telematics data with respect to users associated with user devices 110 and 112. Further, modeling computing device 102 may use the telematics data to create driving profiles including driving characteristics for the users associated with user devices 110 and 112. Modeling computing device 102 may use the driving profiles of the users to predict liability amounts of the users using a model generated by modeling computing device 102.

User device 120 may be a computer that includes a web browser or a software application, which enables user device 120 to access remote computer devices, such as modeling computing device 102, using the Internet or other network. In some embodiments, client device may be associated with, or part of a computer network associated with, an insurance company. In other embodiments, user device 120 may be associated with a third party. More specifically, client device 120 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client device 120 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users (e.g., personal information, insurance claims data), telematics and environmental data of the users, liability amount data of the users, prediction data, third party data, etc. In the exemplary embodiment, database 106 may be stored remotely from modeling computing device 102. In some embodiments, database 106 may be decentralized. In the exemplary embodiment, a user may access database 106 and/or modeling computing device 102 via user devices 110 and 112.

Exemplary Process of Generating Models and Liability Amounts

Figure 2:
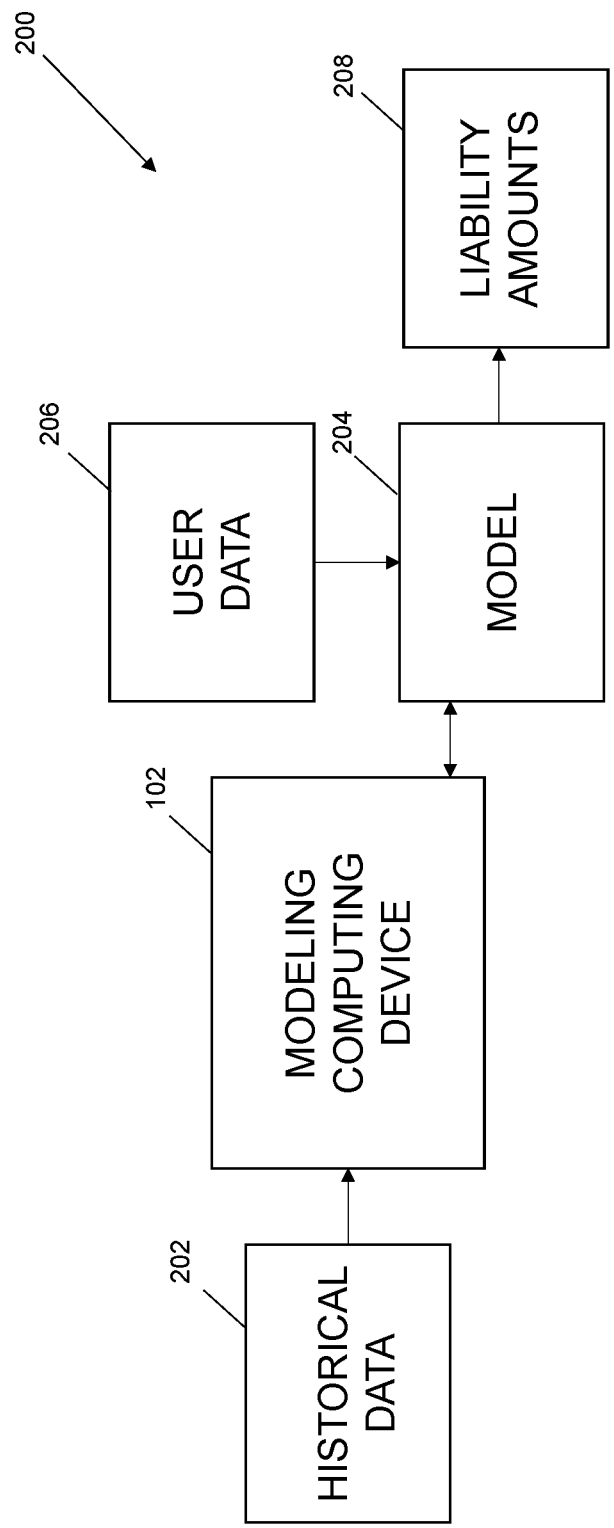
FIG. 2 illustrates an exemplary process of generating a model and liability amounts using the modeling system illustrated in FIG. 1.

FIG. 2 illustrates a flowchart of a process 200 of generating a model 204 and liability amounts 208. In some embodiments, the process 200 is implemented by modeling computing device 102.

Historical data 202 may be input into modeling computing device 102. Historical data 202 may include, for example, historical user data (e.g., telematics, positioning, and/or environmental data generated by telematics, position, and/or environmental sensors, as described herein) and historical insurance data (e.g., liability limit data, filed claim data, natural loss data, etc.). Historical data 202 may be stored in a database (e.g., database 106 shown in FIG. 1) associated with modeling computing device 102.

Upon receiving historical data 202, modeling computing device 102 may generate a model 204 based upon the historical data 202. Modeling computing device 102 may generate model 204 by relating one or more sets of the historical data 202. In some embodiments, model 204 may be built by relating one or more of the historical vehicle position data, telematics data, and/or environmental data with the historical insurance data. That is, model 204 may use historical data 202 to predict and/or generate insurance data (e.g., liability amounts) for new users (e.g., based upon new user data). In the exemplary embodiment, model 204 may be part of modeling computing device 102 such that modeling computing device 102 receives new user data (e.g., user data 206) and uses model 204 to generate insurance data. For example, model 204 may be stored in a database (e.g., database 106) associated with modeling computing device 102. In other embodiments, model 204 is separate from modeling computing device 102.

Modeling computing device 102 may be configured to generate, using model 204, insurance data for current/new user data. User data 206 may be input into model 204 (e.g., by modeling computing device 102 when modeling computing device 102 receives user data 206). User data 206 may include, for example, current telematics, positioning, and/or environmental data (e.g., generated by telematics, position, and/or environmental sensors) associated with a user. Model 204 may generate and/or predict liability amounts 208 for the user based upon user data 206. Liability amounts 208 may include, for example, liability limit amounts, liability loss amounts, and/or claim amounts.

For example, if user data 206 shows that the user is a safe driver that typically drives on rural roads with not many other cars or pedestrians around, model 204 may generate relatively low liability limits for the user. Further, model 204 may predict that if an accident with the user did occur, the liability loss amount and/or the claim amounts may be relatively low due to user data 206 showing that the user does not typically drive around other cars or pedestrians. If user data 206 shows that the user is a relatively unsafe driver that typically drives on city roads with many other cars and pedestrians present, model 204 may generate relatively high liability limits for the user. Model 204 may also predict that if an accident with the user did occur, the liability loss amount and/or claim amounts may be relatively high due to user data 206 showing that the user typically drives around many other cars and pedestrians.

Based upon liability amounts 208, modeling computing device 102 may generate an insurance policy for the user associated with user data 206. That is, modeling computing device 102 may use the liability limits, the liability loss amounts, and/or the claim amounts generated/predicted by model 204 to generate the insurance policy. Further, modeling computing device 102 and/or model 204 may use user data 206 to generate recommendations for the user to lower risks associated with the user which may lower an insurance premium associated with the generated insurance policy. For example, modeling computing device 102 may recommend that the user avoid a very busy and dangerous intersection along a commute of the user. Further, modeling computing device 102 may adjust the insurance policy and/or insurance premiums based upon the user following the recommendations of modeling computing device 102. For example, modeling computing device 102 may continually receive user data 206 (e.g., in real-time, in near-real-time, daily, weekly, monthly, etc.). If user data 206 shows that the user is adhering to the recommendations of modeling computing device 102 (e.g., by avoiding the busy and dangerous intersections), modeling computing device 102 may adjust the insurance policy and/or associated insurance premiums such that the policy and premiums are lower.

Exemplary Client Computing Device

Figure 3:
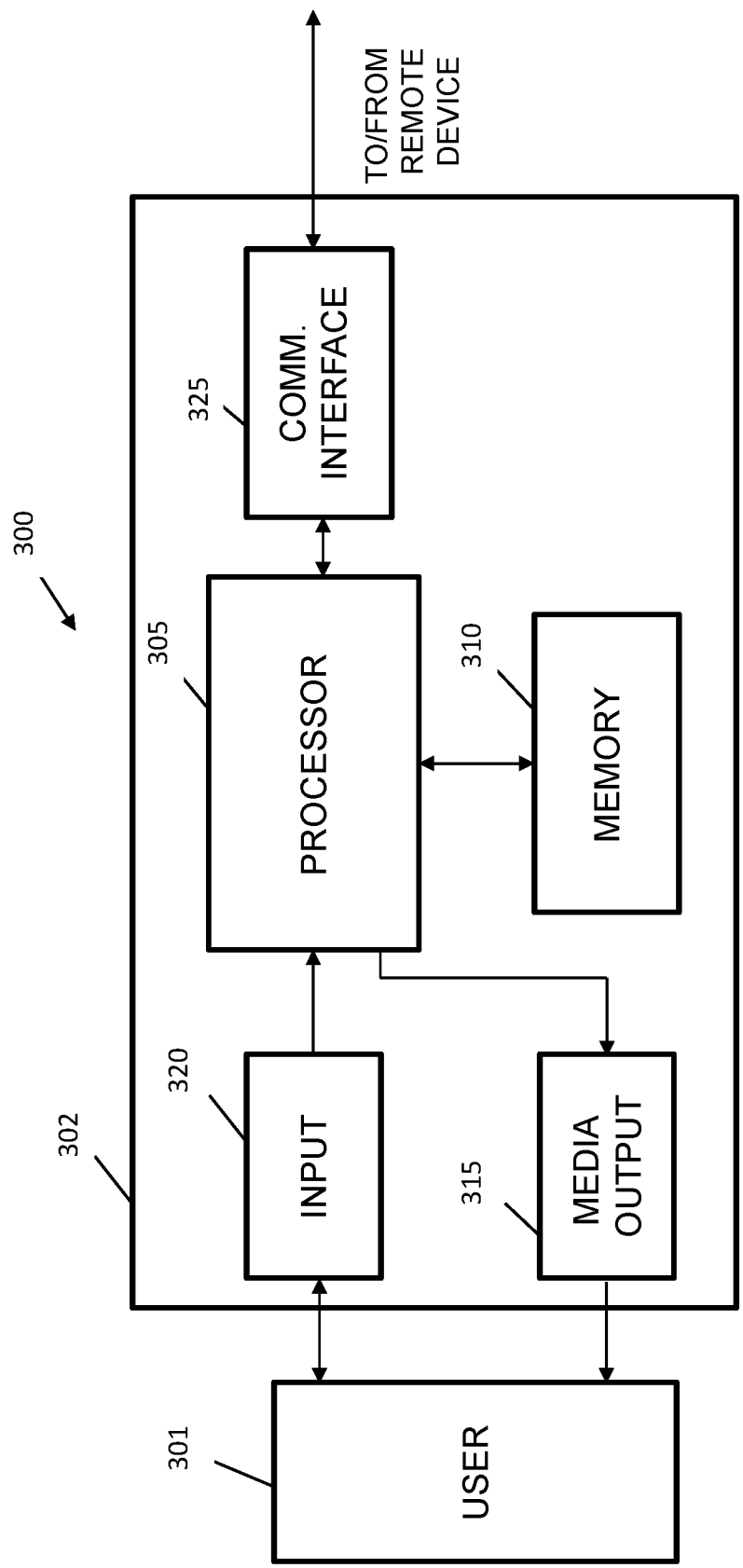
FIG. 3 illustrates an exemplary client computing device that may be used with the modeling system illustrated in FIG. 1.

FIG. 3 illustrates a block diagram 300 of an exemplary client computing device 302 that may be used with modeling computing system 100 shown in FIG. 1. Client computing device 302 may be, for example, at least one of devices 110, 112, and 120 (all shown in FIG. 1).

Client computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer readable media.

In exemplary embodiments, processor 305 may include and/or be communicatively coupled to one or more modules for implementing the systems and methods described herein. For example, in one exemplary embodiment, a module may be provided for receiving data and building a model based upon the received data. Received data may include, but is not limited to, telematics data pertaining to users, environmental data pertaining to users, and insurance claims data pertaining to users. A model may be built upon this received data, either by a different module or the same module that received the data. Processor 305 may include or be communicatively coupled to another module for generating one or more liability amount predictions based upon received data pertaining to a user, such as one or more of driving history data, telematics data, GPS data, and environmental data.

In one or more exemplary embodiments, computing device 302 may also include at least one media output component 315 for presenting information a user 301. Media output component 315 may be any component capable of conveying information to user 301. In some embodiments, media output component 315 may include an output adapter such as a video adapter and/or an audio adapter. An output adapter may be operatively coupled to processor 305 and operatively coupled to an output device such as a display device (e.g., a liquid crystal display (LCD), a light emitting diode (LED) display, an organic light emitting diode (OLED) display, a cathode ray tube (CRT) display, an "electronic ink" display, a projected display, etc.) or an audio output device (e.g., a speaker arrangement or headphones). Media output component 315 may be configured to, for example, display a status of the model and/or display a prompt for user 301 to input user data. In another embodiment, media output component 315 may be configured to, for example, display a result of a liability amount prediction generated in response to receiving user data described herein and in view of the built model.

Client computing device 302 may also include an input device 320 for receiving input from a user 301. Input device 320 may include, for example, a keyboard, a pointing device, a mouse, a stylus, a touch sensitive panel (e.g., a touch pad or a touch screen), a gyroscope (e.g., gyroscope 118, shown in FIG. 1), an accelerometer (e.g., accelerometer 116, shown in FIG. 1), a position detector (e.g., GPS 114, shown in FIG. 1), or an audio input device. A single component, such as a touch screen, may function as both an output device of media output component 315 and an input device of input device 320.

Client computing device 302 may also include a communication interface 325, which can be communicatively coupled to a remote device, such as Modeling computing device 102, shown in FIG. 1. Communication interface 325 may include, for example, a wired or wireless network adapter or a wireless data transceiver for use with a mobile phone network (e.g., Global System for Mobile communications (GSM), 3G, 4G, or Bluetooth) or other mobile data networks (e.g., Worldwide Interoperability for Microwave Access (WIMAX)). The systems and methods disclosed herein are not limited to any certain type of short-range or long-range networks.

Stored in memory area 310 may be, for example, computer readable instructions for providing a user interface to user 301 via media output component 315 and, optionally, receiving and processing input from input device 320. A user interface may include, among other possibilities, a web browser or a client application. Web browsers may enable users, such as user 301, to display and interact with media and other information typically embedded on a web page or a website.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAN). The above memory types are exemplary only, and are thus not limiting as to the types of memory usable for storage of a computer program.

Exemplary Server Computing Device

Figure 4:
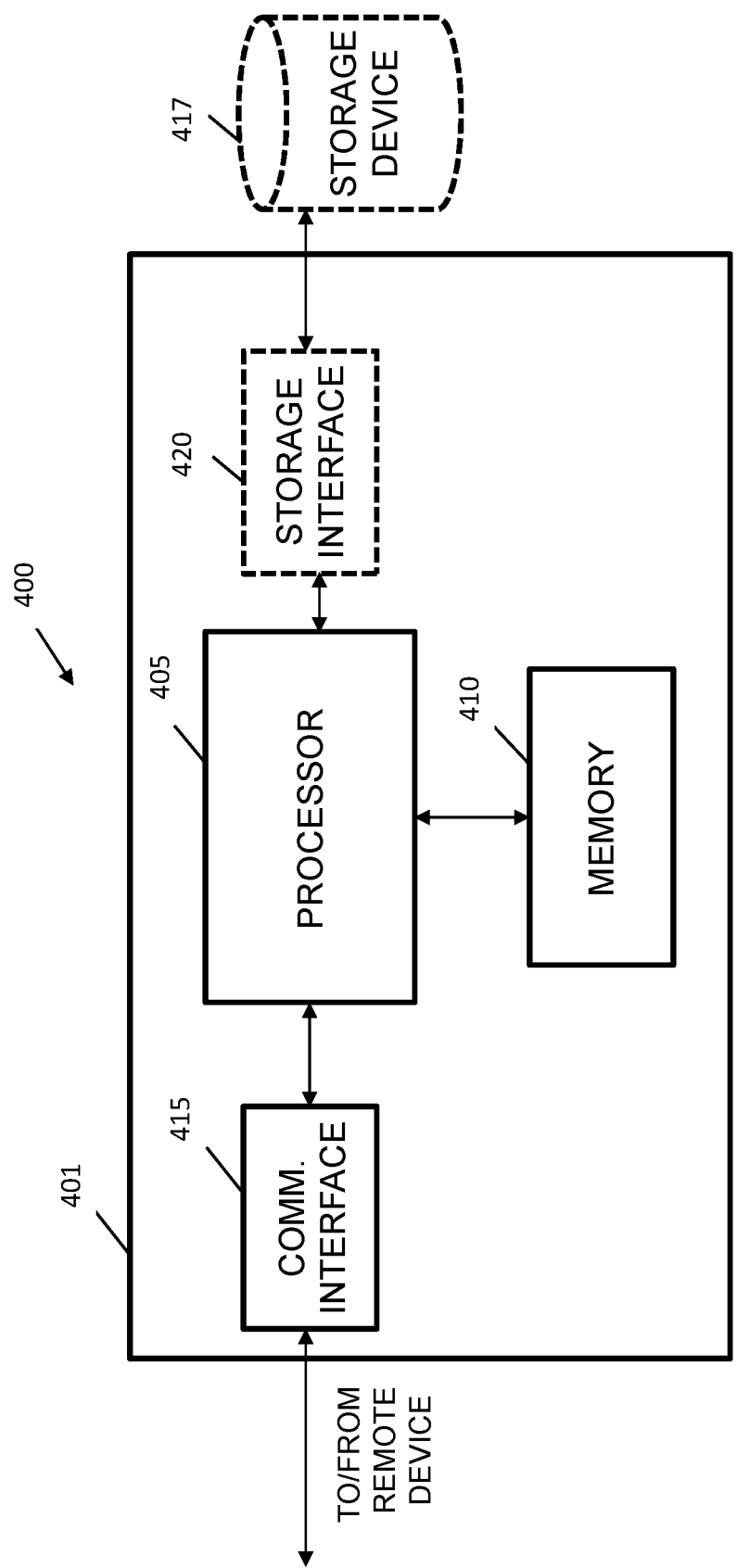
FIG. 4 illustrates an exemplary server system that may be used with the modeling system illustrated in FIG. 1.

FIG. 4 depicts a block diagram 400 showing an exemplary server system 401 that may be used with the LP system 100 illustrated in FIG. 1. Server system 401 may be, for example, modeling computing device 102 or database server 104 (shown in FIG. 1).

In exemplary embodiments, server system 401 may include a processor 405 for executing instructions. Instructions may be stored in a memory area 410. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 may be operatively coupled to a communication interface 415 such that server system 401 is capable of communicating with modeling computing device 102, user devices 110, 112, and 120 (all shown in FIG. 1), and/or another server system. For example, communication interface 415 may receive data from user devices 110 and 112 via the Internet.

Processor 405 may also be operatively coupled to a storage device 417, such as database 106 (shown in FIG. 1). Storage device 417 may be any computer-operated hardware suitable for storing and/or retrieving data. In some embodiments, storage device 417 may be integrated in server system 401. For example, server system 401 may include one or more hard disk drives as storage device 417.

In other embodiments, storage device 417 may be external to server system 401 and may be accessed by a plurality of server systems. For example, storage device 417 may include multiple storage units such as hard disks or solid state disks in a redundant array of inexpensive disks (RAID) configuration. Storage device 417 may include a storage area network (SAN) and/or a network attached storage (NAS) system.

In some embodiments, processor 405 may be operatively coupled to storage device 417 via a storage interface 420. Storage interface 420 may be any component capable of providing processor 405 with access to storage device 417. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 417.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer system.

Exemplary Liability Predicting Computing Device and Components

Figure 5:
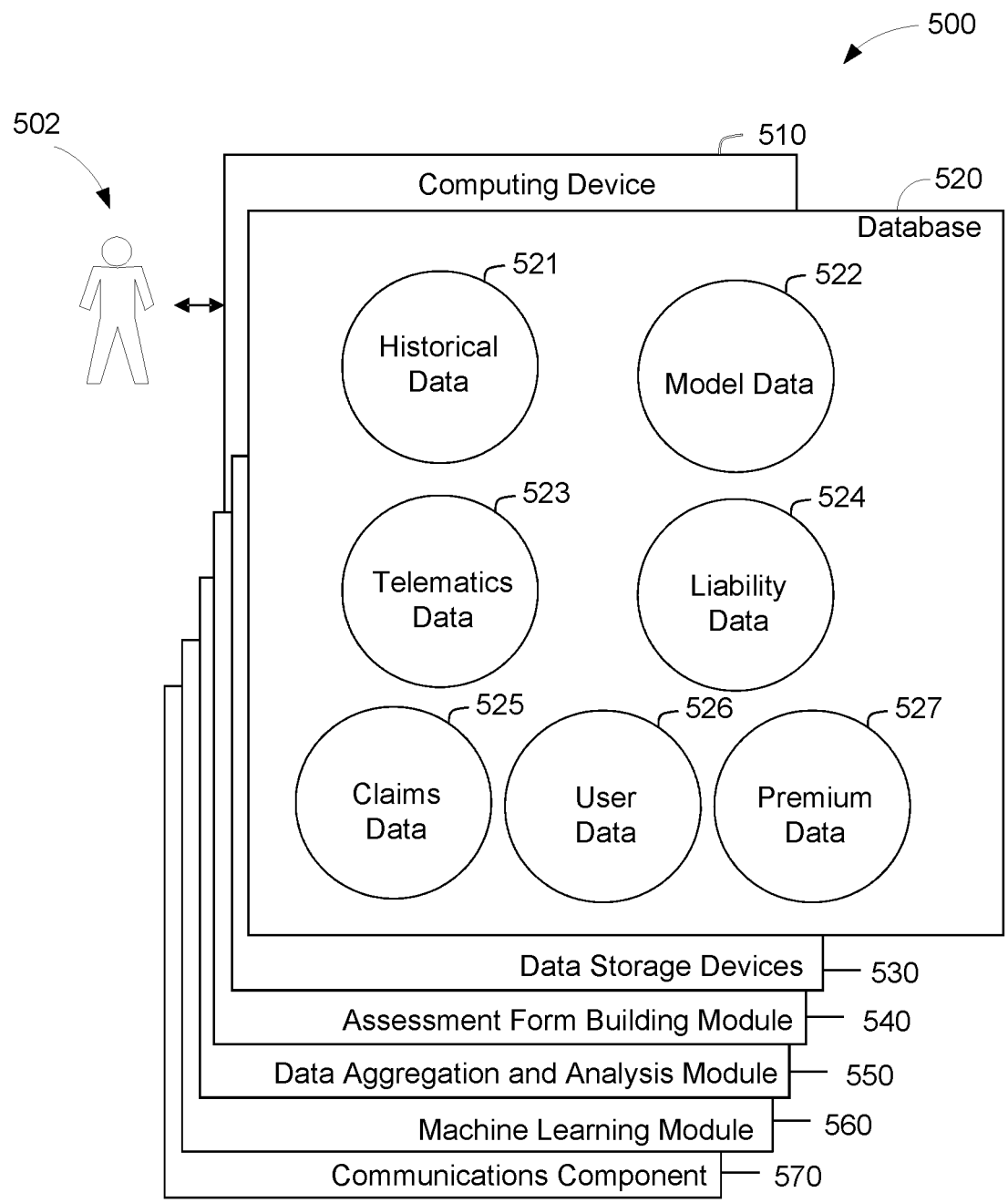
FIG. 5 illustrates a diagram of an exemplary computer device that may be found in the modeling system illustrated in FIG. 1.

FIG. 5 depicts a diagram 500 of components of one or more example computing devices 510 that may be used in a modeling system, such as modeling computer system 100 (shown in FIG. 1) by a user 502. In some embodiments, computing device 510 may be similar to modeling computing device 102 (shown in FIG. 1). Database 520 may be coupled with several separate components within computing device 510, which perform specific tasks. In the present embodiment, database 520 may store aggregated data from users and/or sensors as described herein. For example, database 520 may store historical data 521, model data 522, telematics data 523, liability data 524, claims data 525, user data 526, and premium data 527. Further, database 520 may store one or more models created by the systems described herein for accurately predicting one or more liability amounts. In some embodiments, database 520 is similar to database 106 (shown in FIG. 1).

Computing device 510 may include database 520, as well as data storage devices 530, which may be used, for example, for storing data, such any of the data mentioned herein, locally. Computing device 510 may also module 540, data aggregation and analysis module 550, machine learning module 560, and communications component 570, which may be utilized to implement the functionalities of a modeling computing device as described herein.

Exemplary Computer-Implemented Method for Predicting Liability Amounts

Figure 6:
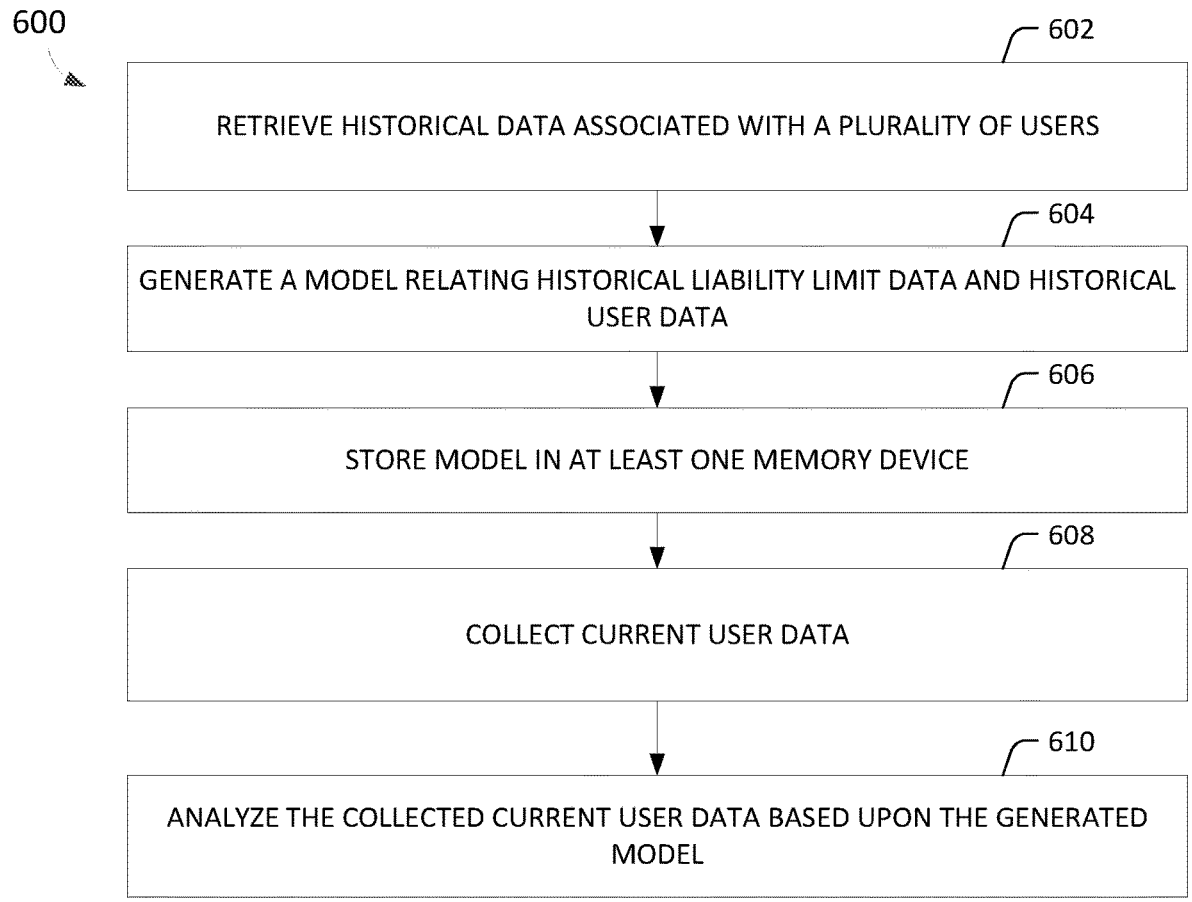
FIG. 6 illustrates an exemplary method implemented by the modeling system illustrated in FIG. 1.

FIG. 6 depicts an exemplary method 600 for analyzing user data using a model. Method 600 may be performed by modeling computing device 102 (shown in FIG. 1). The generated model may be stored within a storage device associated with modeling computing device 102, such as database 106.

Method 600 may include retrieving 602 historical data associated with a plurality of users. The historical data may include historical liability amount data and historical user data, and the historical user data may include at least one of historical personal information, historical vehicle telematics data, and historical environmental data. Method 600 may further include generating 604 a model. The model may relate historical liability amount data and historical user data. Method 600 may also include storing 606 the model in a memory device. The model may be stored on a local storage device in relation to modeling computing device 102 or on a remote storage device (e.g., database 106 shown in FIG. 1).

Method 600 may include the collecting 608 current user data associated with a candidate user. The current user data may include current personal information, current vehicle telematics data, and current environmental data. In some embodiments, the current user data may be collected by one or more sensors including, for example, telematics sensors, GPS devices, and/or environmental sensors. Further, method 600 may include analyzing 610 the current user data based upon the model.

Method 600 may include additional, less, or alternate actions, including those discussed elsewhere herein.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by TA computing device 102, for example, to identify patterns between initial and subsequent feedback provided by entities, such as clients or agencies, and in view of recommendations made by the TA computing device 102. Accordingly, the systems and methods described herein may use machine learning algorithms for both pattern recognition and predictive modeling.

Exemplary Embodiments

In one embodiment, a modeling computing device including at least one processor in communication with a memory device may be provided. The at least one processor may be configured to: (i) retrieve, from the at least one memory device, historical data associated with a plurality of users, wherein the historical data includes historical liability amount data and historical user data, and wherein the historical user data includes at least one of historical personal information, historical vehicle telematics data, and historical environmental data, (ii) generate a model that relates the historical liability amount data and the historical user data, (iii) store the model in the at least one memory device, (iv) collect current user data associated with a candidate user, wherein the current user data includes current personal information, current vehicle telematics data, and current environmental data, and/or (v) analyze the collected current user data based upon the generated model. The modeling computing device may include additional, less, or alternate actions, including those discussed elsewhere herein.

For example, the model may predict a liability amount based upon the historical user data, and the at least one processor may further be configured to: (i) determine a liability amount for the user based upon the model and the received current user data, (ii) update the model based upon the determined liability amount and the received current user data, (iii) transmit the determined liability amount to at least one third party, wherein the at least one third party includes an insurance company, and/or (iv) generate an insurance policy for the insurance company based upon the determined liability amount. Further, the model is built using machine learning, artificial intelligence, or a combination thereof.

For further example, the historical vehicle telematics data may comprise one or more measurements collected during operation of a vehicle including velocity, acceleration, direction, and driver behavior characteristics, and the current vehicle telematics data may comprise one or more measurements collected during operation of a vehicle including velocity, acceleration, direction, and driver behavior characteristics. The current vehicle telematics data and current environmental data may be gathered by one or more sensors during operation of the vehicle and associated with the user, and the one or more sensors include a GPS device, an accelerometer, a gyroscope, a camera, and a sensor installed within the vehicle associated with the user or located remotely from the vehicle. The historical environmental data may include at least one of traffic data and pedestrian data, and the current environmental data may include at least one of traffic data and pedestrian data.

In another embodiment, a computer-implemented method implemented by a modeling computing device including at least one processor in communication with at least one memory device may be provided. The computer-implemented method may include: (i) retrieving, from the at least one memory device, historical data associated with a plurality of users, wherein the historical data includes historical liability amount data and historical user data, and wherein the historical user data includes at least one of historical personal information, historical vehicle telematics data, and historical environmental data, (ii) generating a model that relates the historical liability amount data and the historical user data, (iii) storing the model in the at least one memory device, (iv) collecting current user data associated with a candidate user, wherein the current user data includes current personal information, current vehicle telematics data, and current environmental data, and/or (v) analyzing the collected current user data based upon the generated model. The modeling computing device may include additional, less, or alternate actions, including those discussed elsewhere herein.

In a further embodiment, a computer-readable storage medium having computer-executable instructions embodied thereon may be provided. The computer-executable instructions, when executed by at least one processor, may cause the at least one processor to: (i) retrieve, from the at least one memory device, historical data associated with a plurality of users, wherein the historical data includes historical liability amount data and historical user data, and wherein the historical user data includes at least one of historical personal information, historical vehicle telematics data, and historical environmental data, (ii) generate a model that relates the historical liability amount data and the historical user data, (iii) store the model in the at least one memory device, (iv) collect current user data associated with a candidate user, wherein the current user data includes current personal information, current vehicle telematics data, and current environmental data, and/or (v) analyze the collected current user data based upon the generated model. The modeling computing device may include additional, less, or alternate actions, including those discussed elsewhere herein. The computer-readable storage medium may include additional, less, or alternate actions, including those discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A modeling computing device comprising at least one processor in communication with at least one memory device, the at least one processor configured to:
    retrieve, from the at least one memory device, historical data associated with a plurality of users, wherein the historical data includes historical liability amount data and historical user data, and wherein the historical user data includes at least one of historical personal information, historical vehicle telematics data, and historical environmental data;
    create a first plurality of training datasets including the historical liability amount data and the historical user data;
    build, using one or more machine learning programs, a model based upon the first plurality of training datasets;
    store the model in the at least one memory device;
    collect current user data of a candidate user associated with a vehicle, wherein the current user data includes current personal information, current vehicle telematics data, and current environmental data, wherein the current vehicle telematics data and the current environmental data are gathered by one or more sensors during operation of the vehicle, and wherein the one or more sensors include a GPS device, an accelerometer, a gyroscope, a camera, and a sensor installed within the vehicle or located remotely from the vehicle;
    create a second plurality of training datasets by updating the first plurality of training datasets to include the collected current user data;
    update the model by applying the second plurality of training datasets to the model; and
    execute the updated model to determine a current liability amount for the candidate user.

2. The modeling computing device of claim 1, wherein the model is configured to predict a liability amount based upon the historical user data, wherein the liability amount includes a liability limit, a liability loss amount, and a claim amount, and wherein the at least one processor is further configured to:
    apply the updated model to further collected current user data to determine a further current liability amount for the candidate user; and
    further update the updated model based upon the determined further current liability amount.

3. The modeling computing device of claim 1, wherein the at least one processor is further configured to:
    transmit the determined current liability amount to at least one third party, wherein the at least one third party includes an insurance company; and generate an insurance policy for the insurance company based upon the determined current liability amount.

4. The modeling computing device of claim 1, wherein the one or more machine learning programs include machine learning, artificial intelligence, or a combination thereof, and wherein the at least one processor is further configured to build the first plurality of training datasets using the historical data associated with the plurality of users, the historical data including historical insurance data.

5. The modeling computing device of claim 1, wherein:
the historical vehicle telematics data comprises one or more historical measurements collected during historical operation of the vehicle including historical velocity, acceleration, direction, and driver behavior characteristics; and
the current vehicle telematics data comprises one or more current measurements collected during current operation of the vehicle including current velocity, acceleration, direction, and driver behavior characteristics.

6. The modeling computing device of claim 1, wherein the historical environmental data includes at least one of past traffic data and past pedestrian data; and
the current environmental data includes at least one of current traffic data and current pedestrian data.

7. A computer-implemented method implemented by a modeling computing device including at least one processor in communication with at least one memory device, the computer-implemented method comprising:
retrieving, from the at least one memory device, historical data associated with a plurality of users, wherein the historical data includes historical liability amount data and historical user data, and wherein the historical user data includes at least one of historical personal information, historical vehicle telematics data, and historical environmental data;
creating, by the at least one processor, a first plurality of training datasets including the historical liability amount data and the historical user data;
building, by the at least one processor using one or more machine learning programs, a model based upon the first plurality of training datasets;
storing the model in the at least one memory device;
collecting current user data of a candidate user associated with a vehicle, wherein the current user data includes current personal information, current vehicle telematics data, and current environmental data, wherein the current vehicle telematics data and the current environmental data are gathered by one or more sensors during operation of the vehicle, and wherein the one or more sensors include a GPS device, an accelerometer, a gyroscope, a camera, and a sensor installed within the vehicle or located remotely from the vehicle;
creating, by the at least one processor, a second plurality of training datasets by updating the first plurality of training datasets to include the collected current user data;
updating the model by applying the second plurality of training datasets to the model; and
executing the updated model to determine a current liability amount for the candidate user.

8. The computer-implemented method of claim 7, wherein the model is configured to predict a liability amount based upon the historical user data, wherein the liability amount includes a liability limit, a liability loss amount, and a claim amount, and wherein the computer-implemented method further comprises:
applying the updated model to further collected current user data to determine a further current liability amount for the candidate user; and
further updating the updated model based upon the determined further current liability amount.

9. The computer-implemented method of claim 7 further comprising:
transmitting the determined current liability amount to at least one third party, wherein the at least one third party includes an insurance company; and
generating an insurance policy for the insurance company based upon the determined current liability amount.

10. The computer-implemented method of claim 7 wherein the one or more machine learning programs include using machine learning, artificial intelligence, or a combination thereof, and wherein the method further comprises building the first plurality of training datasets using the historical data associated with the plurality of users, the historical data including historical insurance data.

11. The computer-implemented method of claim 7, wherein:
the historical vehicle telematics data comprises one or more historical measurements collected during historical operation of the vehicle including velocity, acceleration, direction, and driver behavior characteristics; and
the current vehicle telematics data comprises one or more current measurements collected during current operation of the vehicle including current velocity, acceleration, direction, and driver behavior characteristics.

12. The computer-implemented method of claim 7, wherein:
the historical environmental data includes at least one of past traffic data and past pedestrian data; and
the current environmental data includes at least one of current traffic data and current pedestrian data.

13. At least one non-transitory computer-readable medium having computer-executable instructions embodied thereon, wherein when executed by a modeling computing device including at least one processor in communication with at least one memory device, the computer-executable instructions cause the at least one processor to:
retrieve, from the at least one memory device, historical data associated with a plurality of users, wherein the historical data includes historical liability amount data and historical user data, and wherein the historical user data includes at least one of historical personal information, historical vehicle telematics data, and historical environmental data;
create a first plurality of training datasets including the historical liability amount data and the historical user data;
build, using one or more machine learning programs, a model based upon the first plurality of training datasets;
store the model in the at least one memory device;
collect current user data of a candidate user associated with a vehicle, wherein the current user data includes current personal information, current vehicle telematics data, and current environmental data, wherein the current vehicle telematics data and the current environmental data are gathered by one or more sensors during operation of the vehicle, and wherein the one or more sensors include a GPS device, an accelerometer, a gyroscope, a camera, and a sensor installed within the vehicle or located remotely from the vehicle;

create a second plurality of training datasets by updating the first plurality of training datasets to include the collected current user data;
update the model by applying the second plurality of training datasets to the model; and
execute the updated model to determine a current liability amount for the candidate user.

14. The at least one non-transitory computer-readable medium of claim 13, wherein the computer-executable instructions further cause the at least one processor to:
apply the updated model to further collected current user data to determine a further current liability amount for the candidate user, wherein the further current liability amount includes a liability limit, a liability loss amount, and a claim amount; and
update the model based upon the determined further current liability amount.

15. The at least one non-transitory computer-readable medium of claim 13, wherein the computer-executable instructions further cause the at least one processor to:
transmit the determined current liability amount to at least one third party, wherein the at least one third party includes an insurance company; and
generate an insurance policy for the insurance company based upon the determined current liability amount.

16. The at least one non-transitory computer-readable medium of claim 13, wherein the one or more machine learning programs include machine learning, artificial intelligence, or a combination thereof, and wherein the computer-executable instructions further cause the at least one processor to build the first plurality of training datasets using the historical data associated with the plurality of users, the historical data including historical insurance data.

17. The at least one non-transitory computer-readable medium of claim 13, wherein:
the historical vehicle telematics data comprises one or more historical measurements collected during historical operation of the vehicle including historical velocity, acceleration, direction, and driver behavior characteristics; and
the current vehicle telematics data comprises one or more current measurements collected during current operation of the vehicle including current velocity, acceleration, direction, and driver behavior characteristics.

* * * * *